United States Patent
Schleinkofer (12)

(10) Patent No.: US 6,321,683 B1
(45) Date of Patent: Nov. 27, 2001

(54) AQUARIUM WAVE-MAKING WATER RETURN DEVICE

(76) Inventor: Edward F. Schleinkofer, 12 Denise La., East Stroudsburg, PA (US) 18301

( * ) Notice: Subject to any disclaimer, the term of this patent is extended or adjusted under 35 U.S.C. 154(b) by 0 days.

(21) Appl. No.: 09/395,404

(22) Filed: Sep. 14, 1999

Related U.S. Application Data

(60) Provisional application No. 60/100,267, filed on Sep. 14, 1998.

(51) Int. Cl.[7] ................................................ A01K 63/00
(52) U.S. Cl. .......................................................... 119/245
(58) Field of Search .................................... 119/245, 247, 119/259, 263, 269, 226, 228; 4/491

(56) References Cited

U.S. PATENT DOCUMENTS

| | | | | |
|---|---|---|---|---|
| 4,966,096 | * | 10/1990 | Adey | 119/3 |
| 5,026,477 | * | 6/1991 | Yen | 210/169 |
| 5,097,795 | * | 3/1992 | Adey | 119/3 |
| 5,732,657 | * | 3/1998 | Idbeis | 119/257 |
| 5,782,204 | * | 7/1998 | Rahn | 119/255 |

OTHER PUBLICATIONS

Freshwater and Marine Aquarium Magazine, published by R/C Modeler Corporation, Sierra Madre, CA 91024, Mar. 1998, copies of cover and pp. 1,20 and 101.

* cited by examiner

Primary Examiner—Peter M. Poon
Assistant Examiner—Kevin Jakel
(74) Attorney, Agent, or Firm—Akin, Gump, Strauss, Hauer & Feld, L.L.P.

(57) ABSTRACT

A wave-making water return device for use in an aquarium, which is constructed to have an inlet to receive water, an outlet to discharge the water into the aquarium, a fluid connection between the inlet and outlet, and an actuator to rotate the outlet so as to make waves of the water in the aquarium. The outlet is rotatable with respect to the inlet around an axis concentric with the inlet. The fluid connection includes an inner pipe coupled with the inlet and rotatably supporting an outer pipe fixed with the outlet. The outer pipe is rotated back and forth around the inner pipe by the actuator. The actuator includes a motor having a motor shaft, a first rigid arm rigidly coupled with the motor shaft, and a second rigid rod pivotally coupled with the first rigid arm and the outlet.

16 Claims, 3 Drawing Sheets

AQUARIUM WAVE-MAKING WATER RETURN DEVICE

This Application claims benefit of Provisional No. 60/100,267, filed Sep. 14, 1998.

BACKGROUND OF THE INVENTION

The present invention relates to a water return device for making water-waves in an aquarium, and more particularly for more uniformly making water-waves.

Some devices for making water-waves in aquariums are known. However, these conventional devices have the shortcoming that the mechanisms for making water-waves tend to lack smooth, uniform operation. As a result, waves of return water are inconsistently generated in the aquarium or are at least not generated uniformly and regularly through the aquarium to more accurately imitate ocean wave action in the relatively small volume of such tanks.

BRIEF SUMMARY OF THE INVENTION

According to a first aspect, the present invention is a device for making waves of water in an aquarium tank, comprising: an inlet to receive water, an outlet to discharge said water into said aquarium tank, said outlet is rotatable with respect to said inlet around an axis concentric with said inlet; a fluid connection between said inlet and outlet, said connection including two pipes concentrically and rotatably fitted together one inside an other, said one pipe is connected with one end of said inlet at one end of said one pipe, while said other pipe is connected with one end of said outlet at one end of said other pipe, said one pipe supporting said other pipe and said outlet for rotation on said one pipe, and an actuator coupled to at least one of said other pipe and said outlet so as to rotate said outlet around said axis so as to make waves of said water in said aquarium tank.

According to a second aspect, the present invention is a device for making waves of water in an aquarium tank, comprising: an inlet to receive water; an outlet to discharge said water into said aquarium tank; a fluid connection between said inlet and outlet; a motor with a motor shaft electrically rotated around an axis thereof, and a rigid linkage to convert rotation of said motor shaft into rotation of said outlet around an axis thereof, by using only a plurality of rigid links to transmit motion from said motor shaft into said outlet, so as to make waves of said water in said aquarium tank.

BRIEF DESCRIPTION OF THE SEVERAL VIEWS OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

Figure 1:
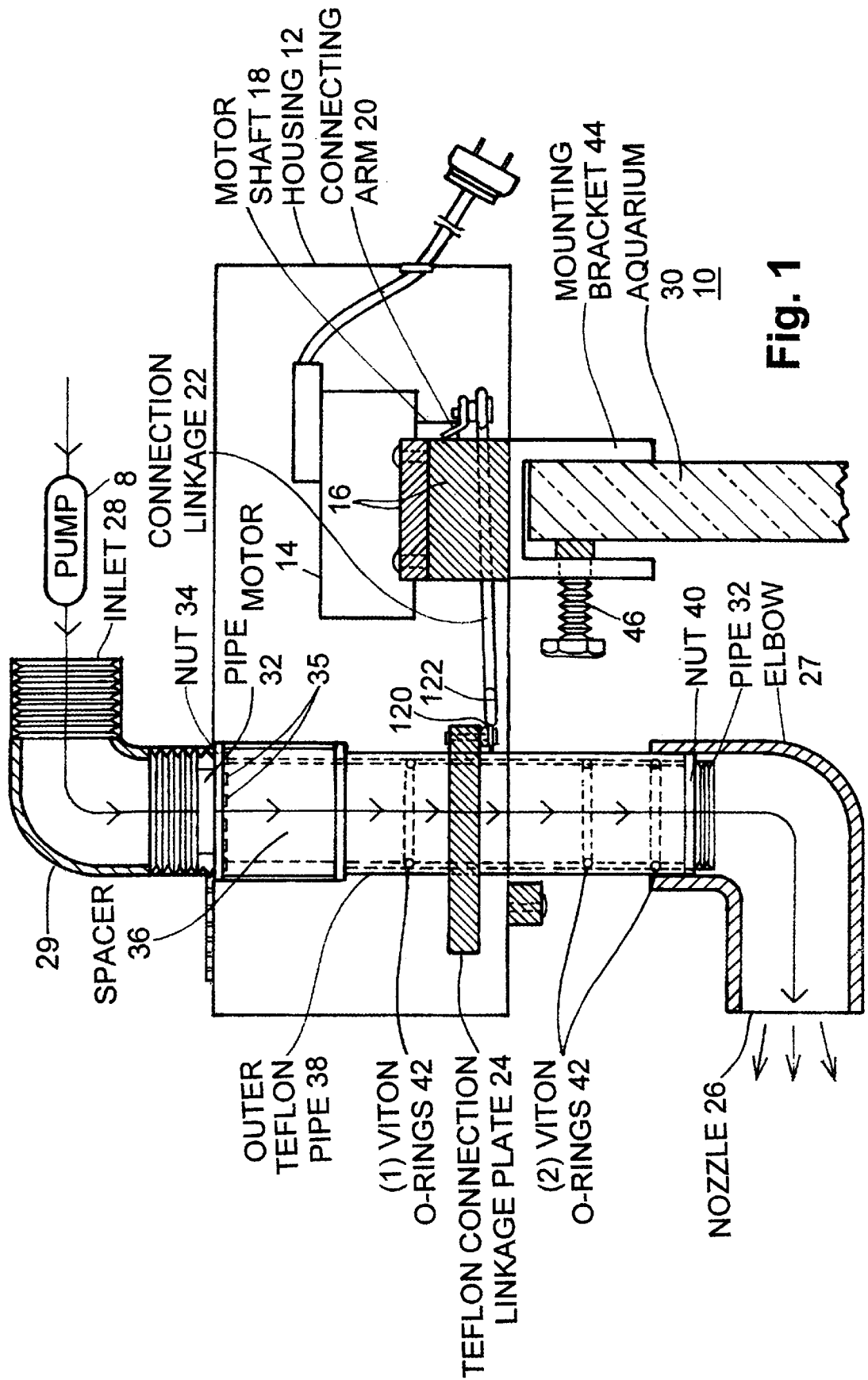
FIG. 1 is a side view partly in cross section of a device according to one preferred embodiment of the present invention.
Figure 2:
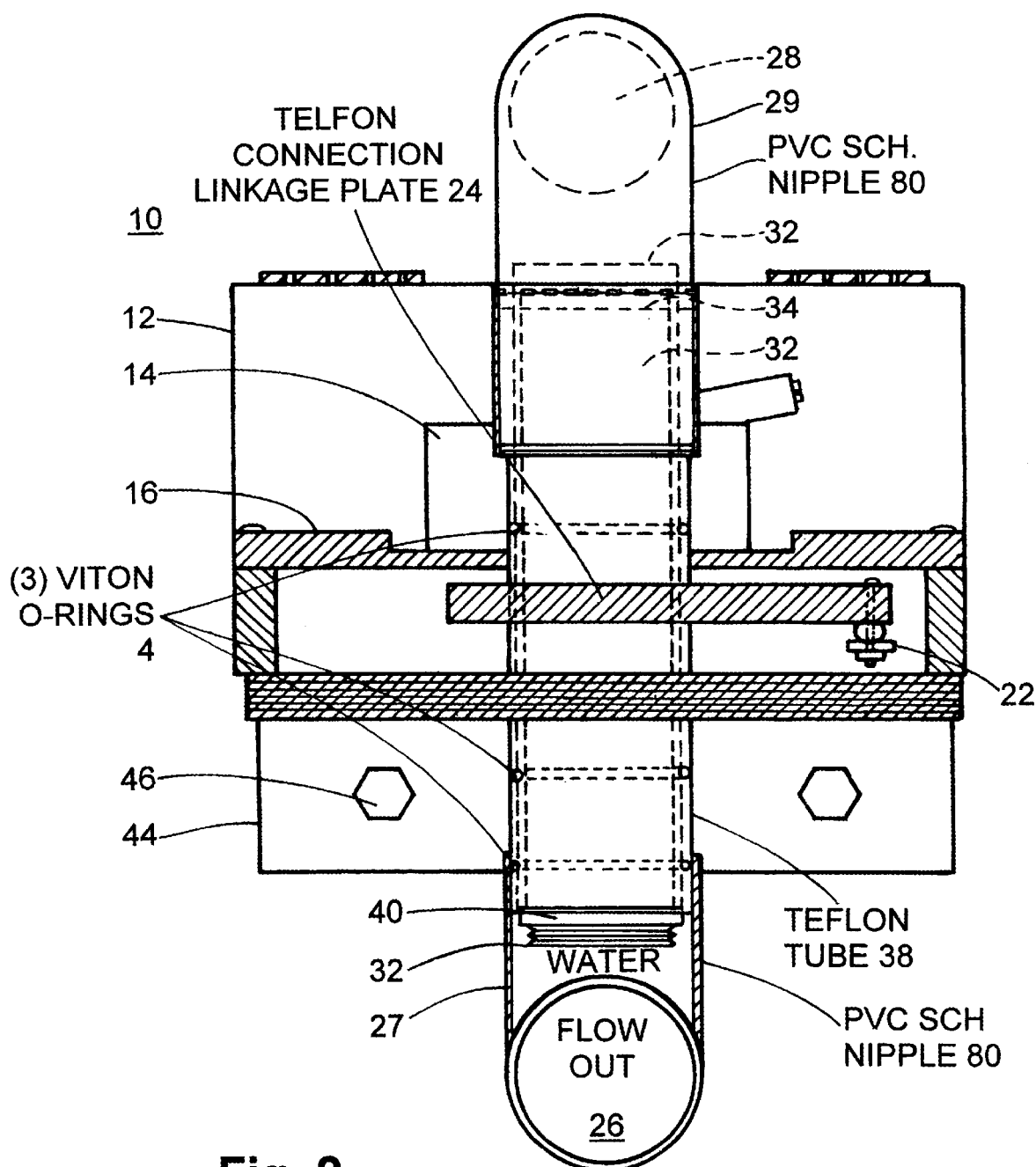
FIG. 2 is an end view partly in cross section of the device of FIG. 1.
Figure 3:
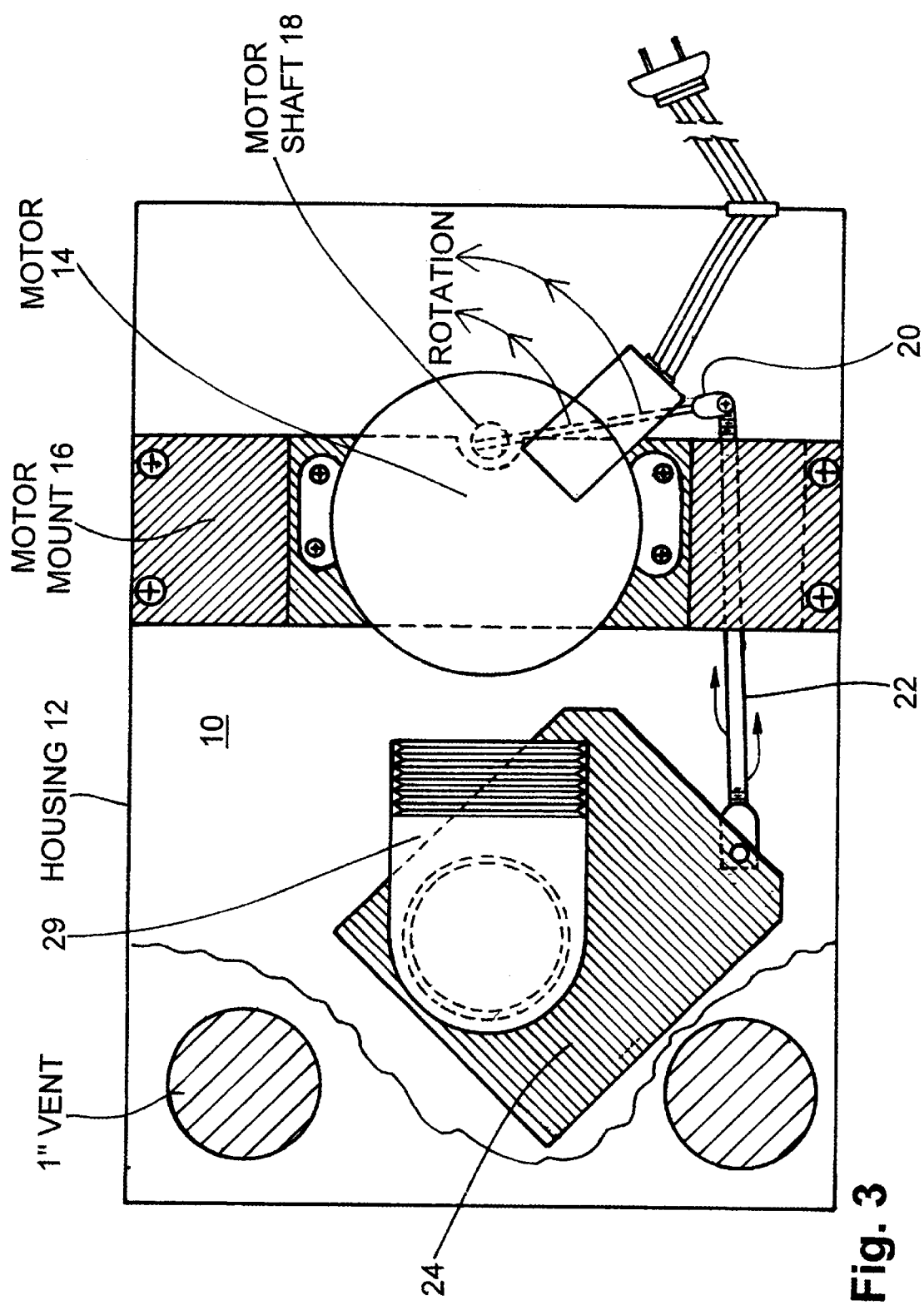
FIG. 3 is a top view partly in cross section of the device of FIG. 1.

One presently preferred embodiment of the invention will be described in detail by reference to the drawings. FIGS. 1, 2 and 3 show a preferred embodiment of the water return device invention, which is indicated generally at 10 in all three figures. Briefly, the device 10 is an electrically powered one which is mounted on a top rim of an aquarium tank 30 and, when plugged in, will oscillate a water return to the aquarium tank 30 from a pump 8 or canister filter on a regular basis over a predetermined range (e.g., every sixty seconds over a range of about 90°). The pump 8 may draw water from the aquarium tank 30 or from a sump beneath the tank or from beneath the pump if submersible in the tank and delivers water into an inlet of the device 10 through suitable means such as flexible plastic tubing (not depicted).

The majority of the components of the device 10 are housed in a housing 12. A motor 14, which is part of an actuator, is mounted within the housing 12 on a mount 16. The motor 14 includes a motor shaft 18 and an internal reduction (not shown), which reduce the motor output at the motor shaft 18 to a very low rate, e.g., one revolution per minute. The motor shaft 18 is rigidly coupled with one end of a rigid arm 20, which rotates with the motor shaft 18. A remote end of the arm 20 is pivotally connected to one end of a rigid link 22 in the form of a rigid rod. A remaining end of the rigid link 22 is pivotally connected to a rigid linkage plate 24 which, in turn, is fixed with a nozzle 26 for rotation or more specifically oscillation of the nozzle 26 with rotation of the linkage plate 22. The arm 20, rigid link 22 and rigid linkage plate 24 cooperate to constitute one preferred example of a rigid linkage as part of the actuator. The nozzle 26, as an outlet of the device 10, is located under the surface of water in the aquarium tank 30 to generate the desired water-waves.

The nozzle 26 is rotatably interconnected to an inlet indicated generally at 28. The preferred interconnection is best shown in FIG. 1. The body of the inlet 28 is provided by a 90° elbow 29 with internally threaded ends.

An externally threaded pipe 32 is threaded into one end of the inlet elbow 29. One example of the pipe 32 is formed as a PVC SCH. 80 nipple. The inlet elbow 29 can be secured to the housing 12 by a nut 34 threaded over the end of the pipe 32 within the housing 12. Both the elbow 29 and nut 34 should overlap the housing 12 around the hole through which the pipe 32 extends. The nut 34 can be tightened to be non rotatably fixed elbow 29 with the housing 12 or left loose so that the elbow 29 can be rotated on the housing 12, if desired, or simply supported on the top of pipe 32. The pipe 32 extends completely through the housing 12 and into another 90° elbow 27 forming the body of the nozzle 26 as the outlet. A spacer/collar 36 can be secured to the lower side of the nut 34 by suitable means such as a layer of silicone caulk (beads of which are depicted at 35 in FIG. 1). Alternatively, spacer 36 can simply be supported on the top of pipe 32. Preferably, a tetrafluoroethylene tube 38 is provided as an outer or external pipe and extends around the pipe 32, now an inner or internal pipe, from the lower end of the spacer/collar 36 through the linkage plate 24 and into a facing end of the elbow 27 forming the nozzle 26. The pipe 32 and tube 38 constitute one preferred example of a fluid connection.

A second nut 40 is applied to the threads at the lower end of the pipe 32 and support the lower end of the tube 38. Several (e.g., three) O-rings 42 are located between the internal pipe 32 and the tube 38 to maintain spacing and a fluid seal between the pipe 32 and tube 38. The tube 38 is fixed to the linkage plate 24 by clamping, adhesion or other suitable means to rotate with the linkage plate 24. Finally, the upper end of the nozzle elbow 27 is overlapped on and fixed to the lower end of the tube 38.

In this way, the tube 38, linkage plate 24 and nozzle 26 are all interconnected together as a fixed unit and supported for common rotation on the second nut 40 at the lower end of the internal pipe 32. The internal pipe 32 is itself supported from the housing 12 on the elbow 29 forming the inlet 28.

The motor mount 16 can be secured with a mounting bracket 44 on the lower side of the housing 12. The mounting bracket 44 can be U-shaped as shown and supplied with a screw 46 for clamping over the top rim on a glass wall of a conventional glass walled aquarium tank 30. Suction cups (not shown) can be used in place of the screw 46 to hold the device 10 in position on acrylic tanks.

When plugged in, the nozzle 26 of the device 10 will oscillate the water return from the pump 8 to the aquarium 30 preferably over a range of about 90° for the embodiment shown. Greater or lesser angular rotations can be provided by adjusting the dimensions of the arm/rigid link/linkage plate 20/22/24 arrangement. This sweeping action of the nozzle 26 simulates natural wave motion of the ocean carrying nutrients to different areas of the tank and also carrying waste products away. The device 10 is ideal for use with living coral reef tanks, freshwater planted tanks and aquariums desiring or requiring extra circulation or widely dispersed circulation. The pivotally coupled arm 20/link 22 arrangement further provides a smooth, uniform action over an appreciable range which permits the nozzle 26, outer tube 38 and linkage plate 24 to all be supported at the lower end of the inner pipe 32 for rotation on the pipe 32. The smooth, uniform repeated oscillation of the nozzle 26 provided by the rigid linkage and rotation of the concentric members 32, 38 provides a more uniform and consistent generation of water-waves throughout the aquarium tank 30. While tetrafluoroethylene (i.e., Teflon®) is not required for the outer tube 38, the use of tetrafluoroethylene, as one kind of fluorine-based plastic with low friction coefficient, provides a very smooth rotation on the O-rings 42, which preferably are made made of low friction vinylidene fluoride-hexafluoropropylene copolymers (i.e., Viton®), with little friction or wear. Alternatively, a separate solid lubricant coating (including tetrafluoroethylene, silicone, etc.) may be applied to at least one of the pipe 32, tube 38 and O-rings 42 for a similar though less permanent result.

The present invention may be embodied such that an user of the aquarium tank 30 can vary the direction in which the inlet 28 points in order to make connection with other members easier, hide a return tube, etc.

While a one directional motor can be used, a bidirectional motor is preferred such as a Model 150, 500 or 550 one rpm motor from Autotrol, Inc. of Crystal Lake, Ill. These motors automatically reverses direction when it reaches it maximum permitted safe torque output so that if the output nozzle should somehow be objected in its rotation, the motor will reverse direction to prevent damage to itself or the linkage. Also, the pivots between linkage arms 20 and 22 and between arm 22 and linkage plate 24 are preferably formed from miniature toy vehicle suspension parts for smoothness. Preferably, a #4 shim (120 in FIG. 1), Item No. 12340 of Du-Bro Products, Wauconda, Ill. is connected by a nut and bolt between a pair of Du Bro swivel ball links,. Item No. 14840 (122 in FIG. 1), which are threaded onto the end(s) of rods 20, 22. The shim and swivel ball links create a very flexible, yet secure, ball joint type coupling between the connected members, further adding to the smoothness of the linkage operation.

While the one presently preferred embodiment of this invention has been described by reference to the drawings, it is to be understood that the present invention may be embodied with various changes, modifications and improvements, which may occur to those skilled in the art, without departing from the sprit and scope of the invention defined in the following claims.

What is claimed is:

1. A device for making waves of water in an aquarium tank, comprising:
   an inlet to receive water;
   an outlet to discharge said water into said aquarium tank, said outlet is rotatable with respect to said inlet around an axis concentric with said inlet;
   a fluid connection between said inlet and outlet, said connection including two pipes concentrically and rotatably fitted together one inside an other, said one pipe is connected with one end of said inlet at one end of said one pipe, while said other pipe is connected with one end of said outlet at one end of said other pipe, said one pipe supporting said other pipe and said outlet for rotation on said one pipe, and
   an actuator coupled to at least one of said other pipe and said outlet so as to rotate said outlet around said axis so as to make waves of said water in said aquarium tank.

2. The device according to claim 1 wherein said one pipe includes a flange at a remaining end to receive and support said one end of said other pipe.

3. The device according to claim 1 wherein at least one portion of surfaces of said two pipes is subject to sliding contact and is provided with fluorine-based plastic with low friction coefficient, said sliding contact being made when said two pipes are rotated with respect to each other.

4. The device according to claim 1 wherein said outlet is removably fitted with said one end of said other pipe.

5. The device according to claim 1 wherein one of said two pipes located at an inner side of another pipe is an inner pipe, while said other pipe is an outer pipe, one end of said inner pipe is connected with said one end of said inlet, one end of said outer pipe is connected with said one end of said outlet.

6. The device according to claim 1 wherein said outlet is formed with an elbow so as to bend a water flow in said outlet.

7. The device according to claim 1 located in a water return flow to the aquarium tank from a pump.

8. A device for making waves of water in an aquarium tank, comprising:
   an inlet to receive water,
   an outlet to discharge said water into said aquarium tank;
   a fluid connection between said inlet and outlet, said connection including two pipes concentrically and rotatably fitted together one inside an other, said one pipe is connected with one end of said inlet at one end of said one pipe, while said other pipe is connected with one end of said outlet at one end of said other pipe, said one pipe supporting said other pipe and said outlet for rotation on said one pipe;
   a motor with a motor shaft electrically rotated around an axis thereof; and
   a rigid linkage to convert rotation of said motor shaft into rotation of said outlet around an axis thereof, by using only a plurality of rigid links to transmit motion from said motor shaft into said outlet, so as to make waves of said water in said aquarium tank.

9. The device according to claim 8 wherein said rigid linkage converts continuous rotation of said motor shaft into reciprocal rotation of said outlet.

10. The device according to claim 9 wherein said rigid linkage converts one revolution of said motor shaft into two opposite rotations of said outlet.

11. The device according to claim 8 wherein said rigid linkage includes a rigid rod, one end of which receives rotation of said motor shaft at a position offset from said axis of said motor shaft, another end of which transmits motion of said rigid rod to said outlet at a position offset from said axis of said outlet.

12. The device according to claim 11 wherein said rigid linkage further includes a rigid arm, one end of which is rigidly coupled with said motor shaft, another end of which is pivotally coupled with said one end of said rigid rod.

13. The device according to claim 12 wherein said rigid rod and rigid arm are substantially arrayed in one plane.

14. The device according to claim 11 wherein said rigid linkage further includes a rigid member pivotally coupled with said other end of said rigid rod, and rigidly coupled with said outlet.

15. The device according to claim 14 wherein said rigid member is formed as a rigid linkage plate.

16. The device according to claim 15 wherein said rigid rod and rigid linkage plate are substantially arrayed in one plane.

* * * * *